Patented Nov. 24, 1931

1,833,271

UNITED STATES PATENT OFFICE

BERTHOLD WENK AND HERMANN STÖTTER, OF LEVERKUSEN, NEAR COLOGNE-ON-THE-RHINE, GERMANY, ASSIGNORS TO GENERAL ANILINE WORKS, INC., OF NEW YORK, N. Y., A CORPORATION OF DELAWARE

NEW TRIARYLMETHANE DYESTUFF

No Drawing. Application filed February 16, 1927, Serial No. 168,824, and in Germany March 12, 1926.

The present invention relates to processes for the production of triarylmethane dyestuffs.

It is known that one may obtain triarylmethane dyestuffs by condensing hydroxy-diaryl-methanes with aromatic hydroxy-compounds by means of nitrosyl-sulphuric acid in strong sulphuric acid.

The present invention is based upon the discovery that one can obtain valuable tri-aryl-methane dyestuffs in a much simpler manner by oxidizing hydroxy-diaryl-methanes, hydroxy-diaryl-hydrols or other para-methylated aromatic hydroxy-compounds together with aromatic hydroxy-compounds in alkaline solution.

*Example 1.*—31.6 parts by weight of methylene-di-ortho-cresotinic acid and 34.8 parts by weight of sodium-2-hydroxynaphthalene-3.6-disulfonate are dissolved with, for instance, 475 parts by weight of a 17% solution of sodium hydroxide, and, in order to obtain a better transmission of oxygen, the solution is intensively mixed with air at 90° C. in the presence of 1 part by weight of copper sulphate or another similar metal compound known as an oxidation catalyst, such, for example, as ferric sulfate, ferric chloride, copper chloride and the like. The stirring is continued until no more dyestuff is formed, after which the resulting dyestuff is isolated in the usual manner. It is, in its dry powdered form, a brown powder soluble in water with a reddish coloration which changes into a blue when sodium hydroxide is added to this solution. It dyes wool, with after-chroming, a reddish blue shade. It has most probably the formula:

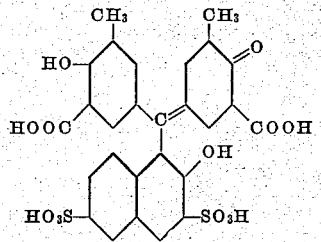

*Example 2.*—15.2 parts by weight of p-cresotinic acid and 30.4 parts by weight of o-cresotinic acid are dissolved in 475 parts by weight of a 17% solution of sodium hydroxide and the reaction mixture oxidized as in Example 1. The resulting dyestuff, a reddish brown powder soluble in an aqueous solution of caustic soda with a red coloration, after-chromated upon wool, yields a reddish purple shade. It has most probably the formula:

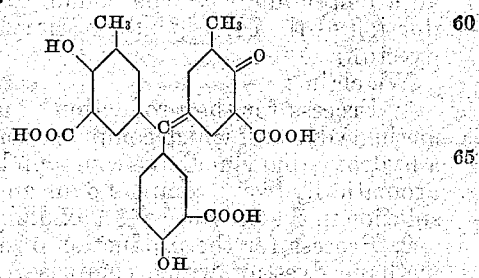

Instead of methylene-di-o-cresotinic acid in Example 1, there may be used other hydroxy-diaryl-methanes, as, for example, methylene-di-o-cresol, methylene-di-salicylic acid, hydroxy-diphenyl-methane and its derivatives, or also unsymmetrical methanes, as, for instance, 4′-di-ethylamino-3-methyl-4-hydroxy-5-carboxy-diphenyl-methane having most probably the formula

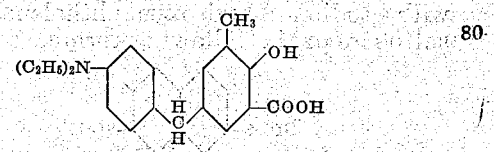

for 4′-hydroxy-3′-carboxy-napthyl-3-methyl-4-hydroxy-5-carboxy-phenyl-methane or the hydrols which correspond thereto.

In place of the sodium salt of 2-naphthol-3.6-disulphonic acid in Example 1, 2-naphthol and its derivatives (such as, for example, the corresponding sulphonic and carboxylic acids), and also corresponding derivatives of the 1-naphthols and poly-hydroxy-naphthalenes, phenols, poly-hydroxybenzols or their carboxylic acids, may be used.

In Example 2, p-cresol or a derivative thereof can be used instead of p-cresotinic acid. In place of o-cresotinic acid in Example 2, other aromatic hydroxy-acids, or phenol, cresol or their substitution-products, or also mixtures,—for instance,—o-cresotinic acid+2-hydroxy-3-naphthoic acid, may be used.

In place of an oxygen-containing gas (e. g., air), other oxidizing media may be used, as, for example, manganese dioxide or protoxid of lead.

It is to be understood that the invention embraces not only the above specifically described procedure, i. e., condensation of an hydroxy diaryl-methane compound with an aromatic hydroxy compound in alkaline solution, but also an equivalent procedure such as, for example, the building up of a diaryl methane compound during the reaction, for example, as is effected when one condenses a compound of the type formula:

wherein the aryl nucleus may be further substituted, with two molecular proportions of an aromatic hydroxy compound, to the production of the corresponding triarylmethane dyestuff.

We claim:

1. Process for the production of a triarylmethane dyestuff which comprises condensing a hydroxy-diarylmethane compound with an aromatic hydroxy compound in an alkaline solution in the presence of an oxidizing agent.

2. Process for the production of a triarylmethane dyestuff which comprises condensing in an alkaline solution methylene di-ortho-cresotinic acid of the following formula:

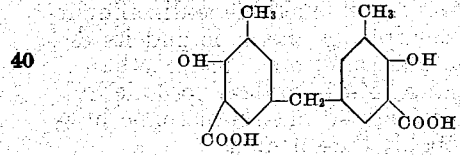

with sodium-2-hydroxynaphthalene-3.6-disulfonate of the following formula:

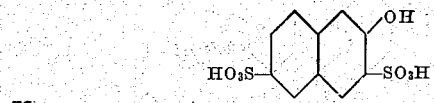

in the presence of copper sulfate at a temperature of about 90° C. while mixing with air.

In testimony whereof, we affix our signatures.

BERTHOLD WENK.
HERMANN STÖTTER.